Jan. 28, 1936. H. J. MARLOWE 2,029,179
VEHICLE JACK
Original Filed July 22, 1931 2 Sheets-Sheet 1

INVENTOR
Harold J. Marlowe
Henry Blech
ATTORNEY

Jan. 28, 1936.  H. J. MARLOWE  2,029,179
VEHICLE JACK
Original Filed July 22, 1931  2 Sheets-Sheet 2

INVENTOR
Harold J. Marlowe
Henry Bloch
ATTORNEY

Patented Jan. 28, 1936

2,029,179

UNITED STATES PATENT OFFICE 2,029,179

VEHICLE JACK

Harold J. Marlowe, Brooklyn, N. Y., assignor to Jackomatic Corporation, a corporation of Delaware Original application July 22, 1931, Serial No. 552,428. Divided and this application March 24, 1932, Serial No. 600,852

13 Claims. (Cl. 254—122)

The invention relates to a lifting device of the kind described in my co-pending application, Serial Number 552,428, filed July 22nd, 1931, of which the instant application is a division.

It is an object of the invention to provide a lifting device for automobiles, which device is constructed as a lazy-tong and provided with a shoe pivotally secured thereto, so that in expanded condition the shoe rests on the ground and the automobile is raised. Whereas, in collapsed condition, the device is hidden behind the axle of the automobile to be practically completely hidden from view.

It is also an object of the invention to provide a lifting device which is constructed in lazy-tong formation with the upper end of one of the topmost links being held against rectilinear movement, while to the upper end of the companion link a horizontal force is applied, whereby respectively expansion and collapse of the lifting device is effected.

It is a further object of the invention to provide means for causing automatic collapse of the device when the maintaining of the automobile in expanded condition is no longer desired.

A furtner object of the invention includes a convenient means for securing the lifting device to the axle of an automobile.

Other and equally important objects will become apparent from a perusal of the invention which comprises the means described in the following specification, particularly pointed out in the claims forming a part thereof, and illustrated in the accompanying drawings, in which Fig. 1 is a side view of an automobile to which my invention has been applied.

Figure 1:
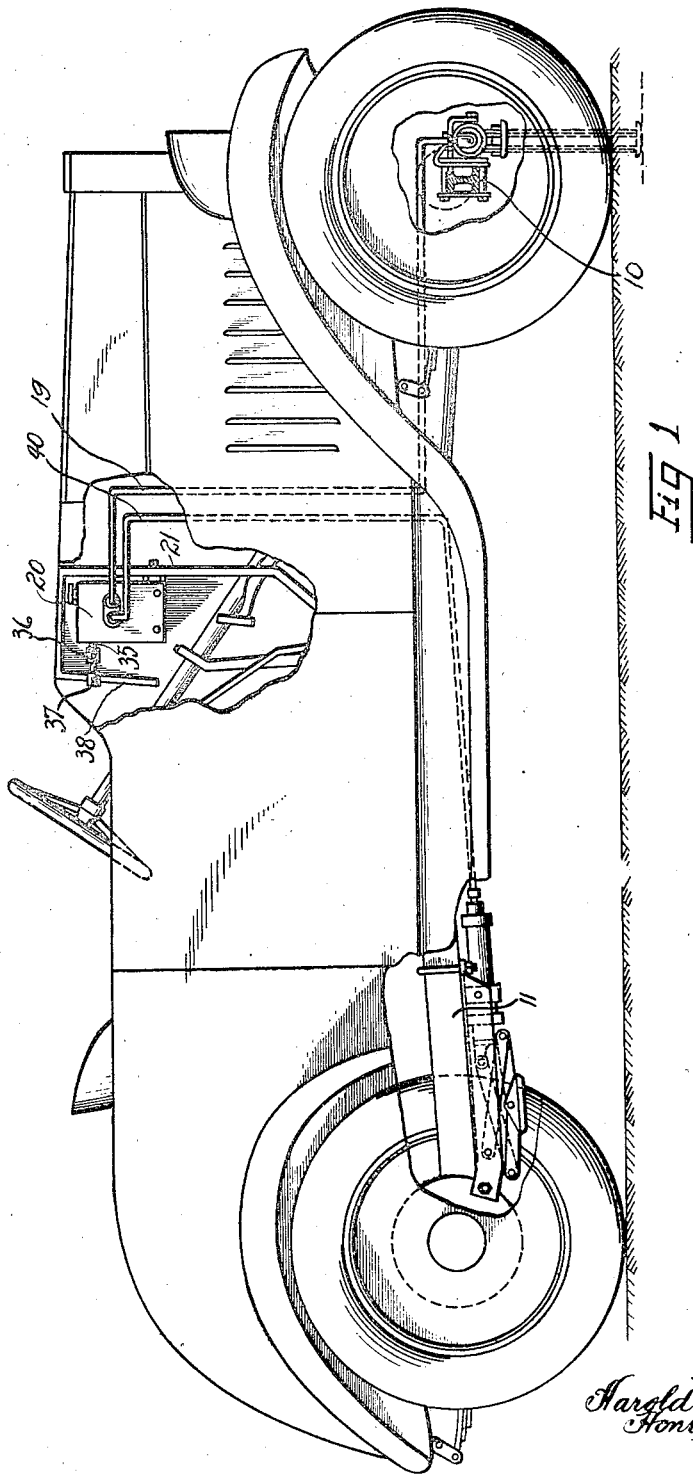
Figure 2:
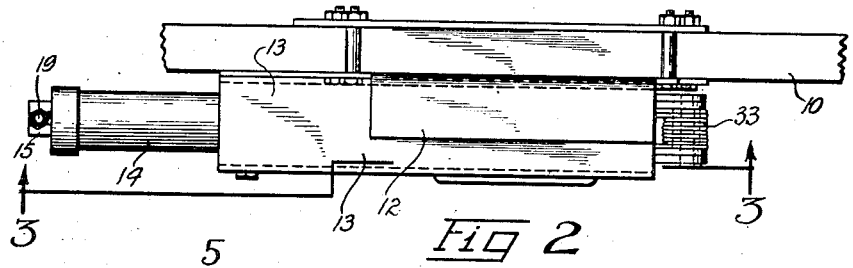
Fig. 2 is a fragmentary top plan view showing an operating cylinder and the jack in idle position.

Referring to the drawings, it will be apparent that a jack is provided at each end of the automobile, there being a jack provided at the front axle 10 and another jack secured to the differential casing of the automobile or to the torque tube 11. Inasmuch as the two jacks are of identical construction, the description of one will suffice.

As shown in Figs. 2 to 6, the axle 10 is provided with a bracket 12 secured to the axle 10 in any approved or convenient manner, and to this bracket is secured an inverted trough or U-shaped member 13 which contains the jack in collapsed condition, and which also has secured thereto a cylinder 14 whose piston serves for the actuation of the jack. The cylinder 14 is substantially in co-axial relation to said trough.

Figure 6:
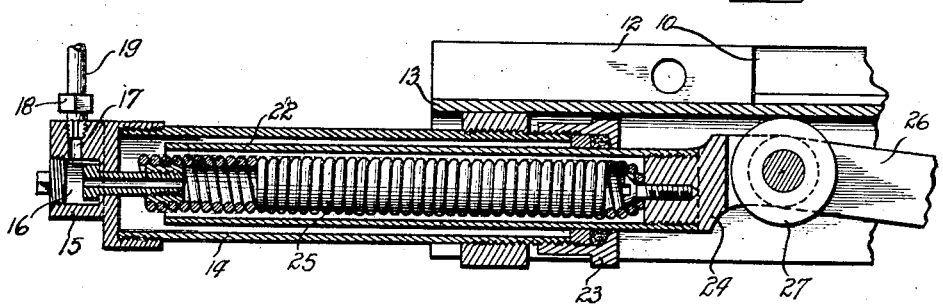
Fig. 6 is a longitudinal section through the operating cylinder for the jack.

As shown in Fig. 6, the cylinder 14 is formed with an extension 15 which is formed with a chamber 16 and a bore 17, into which is screwed a fitting 18 for a pipe 19 conveying oil under pressure to the cylinder from a pump (not shown) contained in the operating unit 20 secured to the cowl board 21 as shown in Fig. 1.

The cylinder surrounds a movable cylinder 22 which projects at the right end, as viewed in Fig. 6, through a packing gland 23 and is provided with a head 24.

A spring 25 connects the cylinder head with the bottom of the stationary cylinder 14, so that after expansion of the spring by reason of an outward movement of the cylinder 22, the latter is retracted into normal position by the contraction of the spring 25.

To the head 24 are secured links 26, there being a roller 27 at the pivotal connection between the cylinder head 24 and the links 26 which moves upon the expulsion of the cylinder 22 on the top part of the trough 13.

Intermediate the links 26 are pivotally secured links 28, whose upper end is articulated to the trough member 13 as at 28', there being springs 29 provided at the pivotal connection of said links, so that these links operate as lazy-tongs. To the links 28 are pivotally connected links 30, and to the links 26 links 31 are pivotally connected, there being springs 32 and 33, respectively, at the pivotal connection of links 28 and 32 and 26 and 31, respectively. The links 30 and 31 are pivotally connected with a shoe 34.

Figure 3:
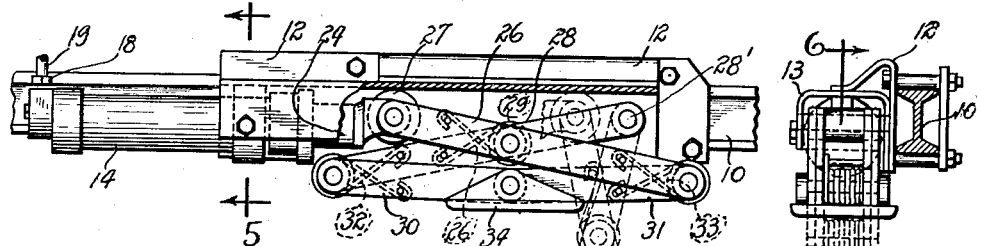
Fig. 3 is a section on the line 3—3 of Fig. 2.
Figure 5:
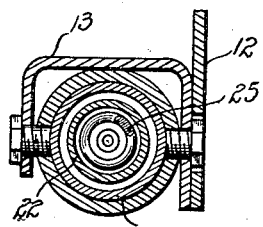
Fig. 5 is a section on the line 5—5 of Fig. 3.
Figure 4:
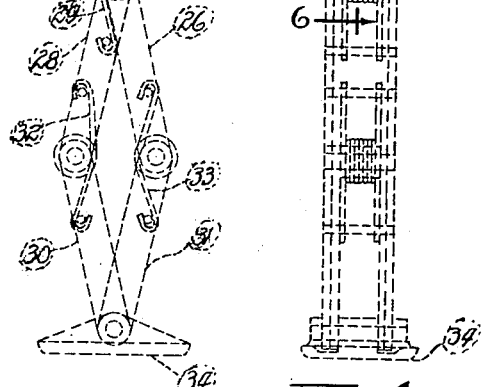
Fig. 4 is an end view of the part shown in Fig. 5.

In Fig. 3, the jack is shown in collapsed condition in full lines, and in expanded condition in dotted lines.

The operation of the device is as follows:

Upon oil being forced into the cylinder, the ram 22 is forced outwardly against the tension of the spring 25, causing the roller 27 to travel on the cross member of the trough 13, whereby the lazy-tong is expanded and the shoe 34 brought in contact with the ground. The continued expansion causes lifting of the vehicle.

To collapse the jack, oil is permitted to escape from the cylinder 14 whereupon the various springs of the jack aided by the compression of the spring 25 force the links upwardly, which normally are received in the trough and but slightly protrude from the trough.

The operating unit 20 has a control shaft 35 connected by a universal joint 36 to a lock 37 (Fig. 1), provided at the dash board 38. The turning of the lock causes oil to flow through the pipe 19 to the front jack or through a pipe 40 to the rear jack for actuation of the respective operating cylinder to cause expansion of the jacks when either the front or the rear of the vehicle is to be raised.

While the drawings disclose a preferred embodiment of the invention, the same are merely illustrated by way of explanation and not by way of limitation. Numerous changes, alterations, and revisions may be made within the purview of the invention.

I, therefore, do not wish to limit myself to the details of construction or arrangement of parts, as shown, but claim my invention as broadly as the state of the art permits.

I claim:

1. A hydraulically operated lifting jack, including in combination, an inverted trough member having an upper cross plate, a jack unit comprising a plurality of links connected in lazy-tong formation, the upper end of one of the topmost links being pivotally secured to said trough, and means including a pressure cylinder secured in alinement with said trough, and a reciprocable piston arranged in the cylinder for moving the upper end of the other topmost link on the upper cross plate of said trough.

2. A hydraulically operated lifting jack, including in combination, an inverted trough adapted to be secured adjacent the underside of a vehicle, said trough having an upper cross plate, a jack unit comprising a plurality of links connected in lazy-tong formation, the upper end of one of the topmost links being pivotally secured to said trough, means for moving the upper end of the other topmost link on the cross plate of said trough and including a pressure cylinder arranged adjacent the end of said trough and in alinement therewith, and a reciprocable piston arranged in the cylinder, said jack unit, when in collapsed condition, resting at least partially within the trough and forming a compact unit with the pressure cylinder.

3. A hydraulically operated lifting jack, including in combination, an inverted trough adapted to be secured adjacent the underside of a vehicle, a jack unit comprising a plurality of links connected in lazy-tong formation, the upper end of one of the topmost links being pivotally secured to said trough, a pressure cylinder secured in said trough, and a reciprocating piston in said cylinder connected with the upper end of the other of the topmost links.

4. A hydraulically operated lifting jack, including in combination, an inverted trough adapted to be secured adjacent the underside of a vehicle, a jack unit comprising a plurality of links connected in lazy-tong formation, the upper end of one of the topmost links being pivotally secured to said trough, a pressure cylinder secured in said trough substantially in co-axial relation thereto, a reciprocating piston in said cylinder connected to the upper end of the other of the topmost links, and a roller carried by said link end and traveling on the cross member of said trough.

5. A jack unit for permanent association with the axle of a vehicle including, in combination, a supporting member having an upper horizontal bearing plate, a jack comprising a plurality of links connected together in lazy-tong formation, the upper end of one of the topmost links being pivotally secured to said supporting member below the plate, an anti-friction element mounted at the upper end of the other of the topmost links and adapted to bear against the bearing plate, a pressure cylinder secured to said supporting member, and a reciprocable piston arranged in the cylinder and having one end thereof connected at the upper end of the link carrying the anti-friction element, said jack when in its collapsed condition resting in substantial horizontal alinement with the cylinder and forming a compact unit therewith.

6. A jack for motor vehicles comprising, in combination, a bracket adapted to be secured to a vehicle body closely adjacent the underside thereof and providing an elongated downwardly-facing horizontal bearing surface, a lazy-tong linkage having two upper links pivoted intermediate their ends and two lower links each pivotally connected at one end to the lower end of one of the upper links, a foot plate supported at the lower ends of the lower links, one of said upper links being pivoted at its upper end to said bracket, a roller mounted on the upper end of the other upper link and bearing against said bearing surface, piston means disposed horizontally at one side edge of the linkage operable positively to move said roller along said horizontal bearing surface in one direction to effect a downward extension of the linkage and impositively to move said roller to retract said linkage, and springs supplemental to said piston means acting between the links at each of the pivotal connections therebetween urging the same to collapsed position to insure complete retraction and to hold the same firmly in retracted position.

7. A jack for motor vehicles comprising, in combination, a bracket adapted to be secured to a vehicle body closely adjacent the underside thereof and providing a horizontally disposed elongated downwardly-facing bearing surface, a lazy-tong linkage having two upper links and two lower links, one of said upper links being pivoted at its upper end to said bracket for pivotal movement about a fixed axis, a roller mounted on the upper end of the other one of said upper links and bearing against said bearing surface, means depending from said bracket forming a horizontal guide for said roller, a foot plate pivotally supported at the lower ends of said lower links, a cylinder supported in horizontal position immediately below said bracket parallel with and at one edge of said linkage, a piston in said cylinder having connection with the roller supporting end of one of said upper links and operable positively to move the same along said bearing surface in one direction to effect a downward extension of the linkage, a tension spring concealed within said cylinder operable to move said roller in the opposite direction to effect a retraction of said linkage, and auxiliary spring means acting between the links aiding to retract the linkage and to retain the same compactly folded so as to require a minimum of space.

8. A hydraulically operated jack adapted for permanent mounting on a vehicle adjacent the underside thereof, including in combination, an extendible and retractable lazy-tong jack unit, cylinder and piston operating mechanism for the jack unit, and a common supporting member for the jack unit and the cylinder and piston mechanism, the connections between the jack unit and the supporting member being such that all vertical components of thrust are transmitted from the jack unit to the vehicle through the supporting member without affecting the cylinder and piston mechanism.

9. A hydraulically operated jack for permanent mounting on a vehicle adjacent the underside thereof, including in combination, a supporting member, an extendible and retractable jack unit comprising a plurality of links connected together in lazy-tong formation, the upper end of one of the topmost links being pivotally connected to said supporting member, the upper end of the other of the topmost links being likewise connected to the supporting member but arranged for longitudinal movement therealong, said connections being such that all vertical components of thrust exerted during the operation of the jack are transmitted directly from the jack to the supporting member, and a cylinder and piston mechanism carried by said supporting member for operating the lazy-tong jack unit.

10. A hydraulically operated jack adapted for permanent mounting on a vehicle adjacent the underside thereof, including in combination, a supporting member, an extendible and retractable jack unit, comprising a plurality of links connected together in lazy-tong formation, the upper end of one of the topmost links being pivotally secured to said supporting member, the upper end of the other of the topmost links being movable, a pressure cylinder secured to said supporting member, and a reciprocable piston arranged in the cylinder and having one end thereof connected to the movable end of the second mentioned upper link, said jack unit when in its retracted position resting in substantial horizontal alinement with said cylinder and forming a compact unit therewith.

11. A hydraulically operated jack for permanent mounting on a vehicle adjacent the underside thereof, including in combination, a supporting member, an extendible and retractable jack unit comprising a plurality of links connected together in lazy-tong formation, the upper end of one of the topmost links being pivotally secured to said supporting member, an anti-friction element mounted at the upper end of the other of the topmost links and arranged to bear on the supporting member, a pressure cylinder secured to said supporting member, and a reciprocable piston arranged in the cylinder and having one end thereof connected at the upper end of the link carrying the anti-friction element, said jack when in its retracted position resting in substantial horizontal alinement with the cylinder and forming a compact unit therewith.

12. A hydraulically operated jack for permanent mounting on a vehicle adjacent the underside thereof, including in combination, a U-shaped supporting member, an extendible and retractable jack unit comprising a plurality of links connected together in lazy-tong formation, the upper end of one of the topmost links being pivotally secured to said supporting member, the upper end of the other of the topmost links being movable along the supporting member and having bearing means resting thereon, a pressure cylinder secured to said supporting member and a reciprocable piston arranged in the cylinder and having one end thereof connected at the upper movable end of the jack unit, said jack unit when in its retracted position resting at least partially in the supporting member in substantial horizontal alinement with the cylinder and forming a compact unit therewith.

13. A hydraulically operated jack adapted for permanent mounting on a vehicle adjacent the underside thereof, including in combination, a supporting member, an extendible and retractable jack unit, comprising a plurality of links pivotally connected together in lazy-tong formation, the upper end of one of the topmost links being pivotally secured to said supporting member, the upper end of the other of the topmost links being movable along the supporting member and provided with bearing means resting thereon, a pressure cylinder secured to said supporting member, a reciprocable piston arranged in the cylinder and having one end thereof connected at the upper movable end of the jack unit, said piston being adapted when moved in one direction to effect the extension of the jack unit to operative position, and spring means arranged at the pivotal connections of the lazy-tong linkage to effect the retraction of the jack to inoperative position, said jack unit when in its retracted position resting in substantial horizontal alinement with said cylinder and forming a compact unit therewith.

HAROLD J. MARLOWE.